United States Patent [19]
Boddie

[11] Patent Number: 4,896,264
[45] Date of Patent: Jan. 23, 1990

[54] MICROPROCESS WITH SELECTIVE CACHE MEMORY

[75] Inventor: James R. Boddie, Hazlet, N.J.

[73] Assignees: American Telephone and Telegraph Company, New York, N.Y.; AT&T Bell Laboratories, Murray Hill, N.J.

[21] Appl. No.: 904,544

[22] Filed: Sep. 8, 1986

[51] Int. Cl.[4] .................................................. G06F 9/00
[52] U.S. Cl. ...................... 364/200; 364/243; 364/243.3; 364/246; 364/246.1; 364/239.4
[58] Field of Search ... 364/200 MS File, 900 MS File

[56] References Cited

U.S. PATENT DOCUMENTS

| | | | |
|---|---|---|---|
| 4,141,067 | 2/1979 | McLagan | 364/200 |
| 4,181,935 | 1/1980 | Feeser et al. | 364/200 |
| 4,195,342 | 3/1980 | Joyce et al. | 364/200 |
| 4,197,580 | 4/1980 | Chang et al. | 364/200 |
| 4,306,287 | 12/1981 | Huang | 364/200 |

OTHER PUBLICATIONS

Electronic Design, Feb. 20, 1986; *Moving Memory Off Chip, DSP µP Squeezes in More Computational Power*, by John Roesgen and Sayuri Tung; pp. 131 to 140, Design Entry.

Primary Examiner—Raulfe B. Zache
Assistant Examiner—John G. Mills
Attorney, Agent, or Firm—Volker R. Ulbrich; Richard B. Havill

[57] ABSTRACT

A signal processing system (10) is described which has a processor (12), a random access memory (14) for storage of data, a read-only memory (16) for storage of both coefficients and instructions, and a selective cache memory (18) for storage of instructions that require high performance, and their associated buses. Instructions selected by the program are stored in the selective cache memory during their first call from the read only memory for use later in the program. An address sequencer (50) is described as one form of a control unit for executing the data stored in the selective cache memory. It generates a sequence of addresses repetitively, counts the number of iterations of the sequence of addresses, and informs the controller when a certain number of iterations have been completed. This creates a conditional branch statement in the program of the signal processing system (10).

2 Claims, 1 Drawing Sheet

MICROPROCESS WITH SELECTIVE CACHE MEMORY

TECHNICAL FIELD

This invention relates to microcomputers, particularly those adapted for processing digital signals.

BACKGROUND OF THE INVENTION

A modern digital signal processor (DSP) is typically a programmable integrated circuit used for the generation, filtering, detection, or modulation of digitally encoded signals A DSP usually consists of a data processing unit and one or more main memories for program data and the data to be processed. The nature of digital signal processing functions, such as signal filtering, is such as to require frequent repetitions, or iterations of sub-sets of data in the form of operands and instructions fetched from memory. The speed and performance of the processor is limited by the rate at which such operands and instructions can be fetched. To reduce this limitation, architectures have been developed which use multiple main memories operating in parallel. For example, one memory can hold data operands to be processed and another can hold instructions. DSP's require a third type of operand storage for data which is only read and never changed in the course of operation. Such an operand is sometimes referred to as a "coefficient". The memories may be arranged as a random access memory (RAM) to hold data operands and two read-only memories (ROM's), one for coefficients and one for instructions. However, such an arrangement can pose problems in both development and application. One problem is in determining the optimum balance between coefficient and instruction memories, since one application may need many locations for instructions and only a few for coefficients, while another may need many locations for coefficients and only a few for instructions. Another problem arises in prototyping, for which the read-only memories must be replaced with memories off-chip. This mode requires the use of numerous external connecting pins for carrying addresses and data connections to the chip.

SUMMARY OF THE INVENTION

The present invention is a digital signal processor with a selective "cache" memory. The main memory functions are carried out in one read-only memory for instructions and coefficients, and two random access memories. One random access memory is for data operands and the other is the selective cache memory for instructions which require high performance. This selective cache memory makes it possible for pieces of code which will have multiple executions to be saved and re-executed on command without the necessity of re-fetching them from a main memory. Such an arrangement provides more flexibility in trading coefficient space for instruction space, provides for easy prototyping, and requires few external connection pins for prototyping. The selective cache memory increases throughput by allowing parallel access of instructions, data, and fixed coefficients, and reduces the required amount of instruction memory by providing a zero overhead mechanism for repeating frequently used instruction sequences.

DETAILED DESCRIPTION

Figure 1:
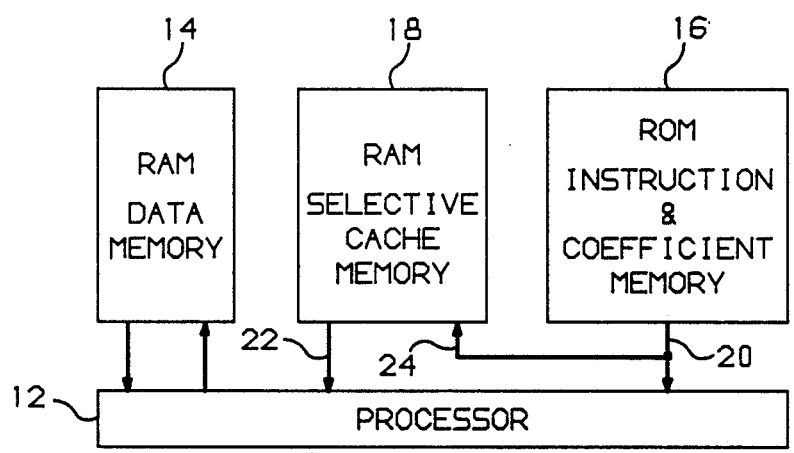
FIG. 1 is a schematic block diagram of a DSP having a selective cache memory.

FIG. 1 shows a digital signal processing system 10 comprising a processor 12 and its associated memories and buses. Connected with the processor 12 is a random access memory 14 for storing data used by the signal processing program, a read only memory 16 used to store both the coefficients and the instructions, and a selective cache memory 18. The processor 12 receives instructions for signal processing either from the read only memory 16 via the bus 20, or from the selective cache memory 18 via the bus 22. Instructions selected by the programmer are stored in the selective cache memory 18 via the bus 24 during their first call from the read only memory 16.

If an instruction set requires fixed coefficients, the instructions can be stored into the selective cache memory 18. Subsequent executions of the instruction set can be done at twice the rate, since the instructions are retrieved from the selective cache memory 18 in parallel with the fetching of the coefficients from the read only memory 16. This speed improvement is illustrated by the following timing diagrams showing the difference between a processing system with one read only memory and no cache memory and a processing system with one read only memory and one cache memory.

```
One read-only memory and no cache memory:
ROM
Access:    I₁   C₁   I₂   C₂   I₃   C₃ ...
One read-only memory and cache memory:
Cache
Access:    I₁   I₂   I₃ ...
ROM
Access:    C₁   C₂   C₃ ...
``` where $I_N$ = read instruction N;
$C_N$ = read coefficient N.

It can be seen that the system with the cache memory can execute the sequence at twice the rate of the system with no cache, since the coefficients and instructions can be accessed simultaneously.

The selective cache memory 18 also improves the speed of execution of a multi-instruction sequence with fixed coefficients which is to be repeated. The following timing diagram illustrates a three-instruction sequence which requires fixed coefficients and will be repeated many times. The diagram shows the selective cache memory 18 storing the instruction on the first iteration and then replaying the whole sequence at the higher rate.

```
Cache
Access:   <I₁> <I₂> <I₃>   I₁ I₂ I₃      I₁ I₂ ...
ROM
Access:   I₁ C₁ I₂ C₂ I₃ C₃   C₁ C₂ C₃    C₁ C₂ ...
          iteration 1         iteration 2  iteration 3
``` where $<I_N>$ = store instruction N.

It can be seen that after the initial iteration when the instructions are stored, the whole sequence can be executed at twice the original speed since the coefficients and instructions are accessed simultaneously.

If the programmer wishes to use the same instructions again later in the program, they may be replayed without going through the storing sequence again.

Figure 2:
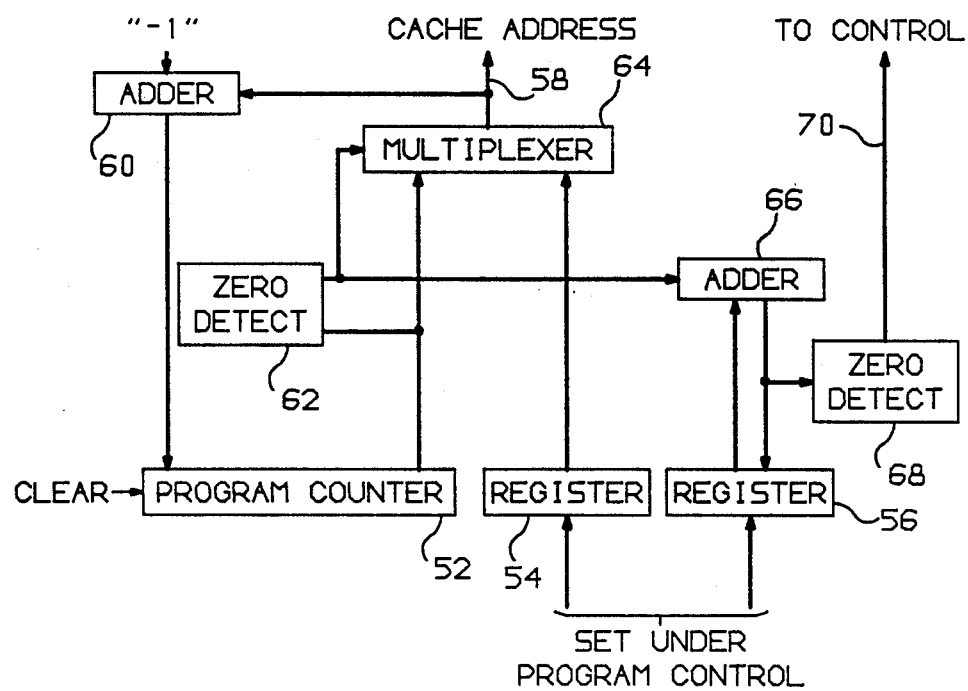
FIG. 2 is a functional block diagram of a memory address controller circuit of the DSP of FIG. 1.

Referring to FIG. 2, there is shown an address sequencer 50 which is used to control the execution of a data set stored in the selective cache memory 18. The address sequencer 50 has a register 52 which is a program counter with a built-in clearing mechanism, a register 54 which sets the starting address in the selective cache memory 18 for the data set to be executed, and a register 56 which is a loop counter for counting the number of iterations of the data set. The clock connections to the registers 52,54,56 would be readily apparent to a person skilled in the art and have therefore been left out to avoid unnecessarily complicating the diagram.

The value of the register 54 is set under program control. The cache memory address 58 is generated from the selection of the register 52 or the register 54. The value of the register 52, which is generated by the adder 60 adding the cache address to negative one, is directed to a zero detect element 62. The values of the register 52 and the register 54 are directed to a multiplexer 64, the output of which is the cache memory address 58. The cache memory address 58 is the value of the register 54 if the value of the register 52 is zero, and it is the value of the register 52 if the value of the register 52 is not zero. The output of the multiplexer 64, which is the cache memory address 58, is controlled by the output of the zero detect element 62, which detects a zero value of the register 52.

The original value of the register 56 is set under program control. The output of the zero detect element 62 is directed to a second adder 66. It is added to the old value of the register 56 and loaded into the register 56. The output of the adder 66 is also directed to a second zero detect element 68 which sends a program control signal 70 if the value of the register 56 is a minus 1.

The addressing sequence begins by loading of the register 54 with a number, M; clearing the register 52; and loading the register 56 with a number, negative K. A clocking of the registers 52, 54, and 56 yields the following sequence.

While the cache memory 18 of the system 10 is program selective with regard to its content, it is within the scope of the invention for the content to be determined by other criteria. For example, it may be always the last instruction or a predetermined number of the previous instructions. With such an arrangement, however, the advantages for repeating the execution of an instruction set is eliminated if there are intervening instructions, since this will change the data in the cache memory.

The digital signal processor system 10 has been used to illustrate one embodiment of this invention, but it would be apparent to one skilled in the art that the speed and efficiency improvement of the selective cache memory 18 would be useful in other data processors as well, for applications requiring frequent repetition of instruction sets.

The particular address sequencer 50 described is one of many ways of implementing a presettable down counter for addressing and executing the data in the selective cache memory 18. Other, similar control units could be used for this purpose.

What is claimed is:

1. A circuit for data processing with at least one primary memory for storing both instructions and coefficients in the form of data, wherein the improvement comprises:
   means for retrieving a set of data, including first and second subsets of data, from said primary memory;
   means for selecting said first subset of data from said set of data;
   a secondary memory for storing said first subset of data;
   means for retrieving concurrently said first subset from said secondary memory and said second subset from said primary memory, and
   control means for selectively executing said first stored subset of data with said second subset of data.

2. The circuit of claim 1 wherein said control means comprises:
   means for repeatedly generating a sequence of addresses;
   means requiring zero lines of code for repeating a predetermined number of times an instruction set stored at said sequence of addresses;

| Cache Addr. | M | M-1 | M-2 | M-3 | ... | 1 | M | M-1 | ... | 1 | M | M-1 | | M-1 | |
|---|---|---|---|---|---|---|---|---|---|---|---|---|---|---|---|
| 52 | 0 | M-1 | M-2 | M-3 | ... | 1 | 0 | M-1 | ... | 1 | 0 | M-1 | ... | M-1 | ... |
| 56 | -K | -K+1 | -K+1 | -K+1 | ... | -K+1 | -K+1 | -K+2 | ... | -K+2 | -K+2 | -K+3 | | 1 | |

The logic repetitively generates the address sequence M, M-1, M-2 . . . 1. The register 56 counts the iterations and informs the program controller when K-1 iterations have been completed. This creates a conditional branch statement in the program of the digital signal processing system 10.

means for counting the iterations of said instruction set; and
   means for informing the control means when said predetermined number of iterations have been completed.

* * * * *